Patented Dec. 30, 1924.

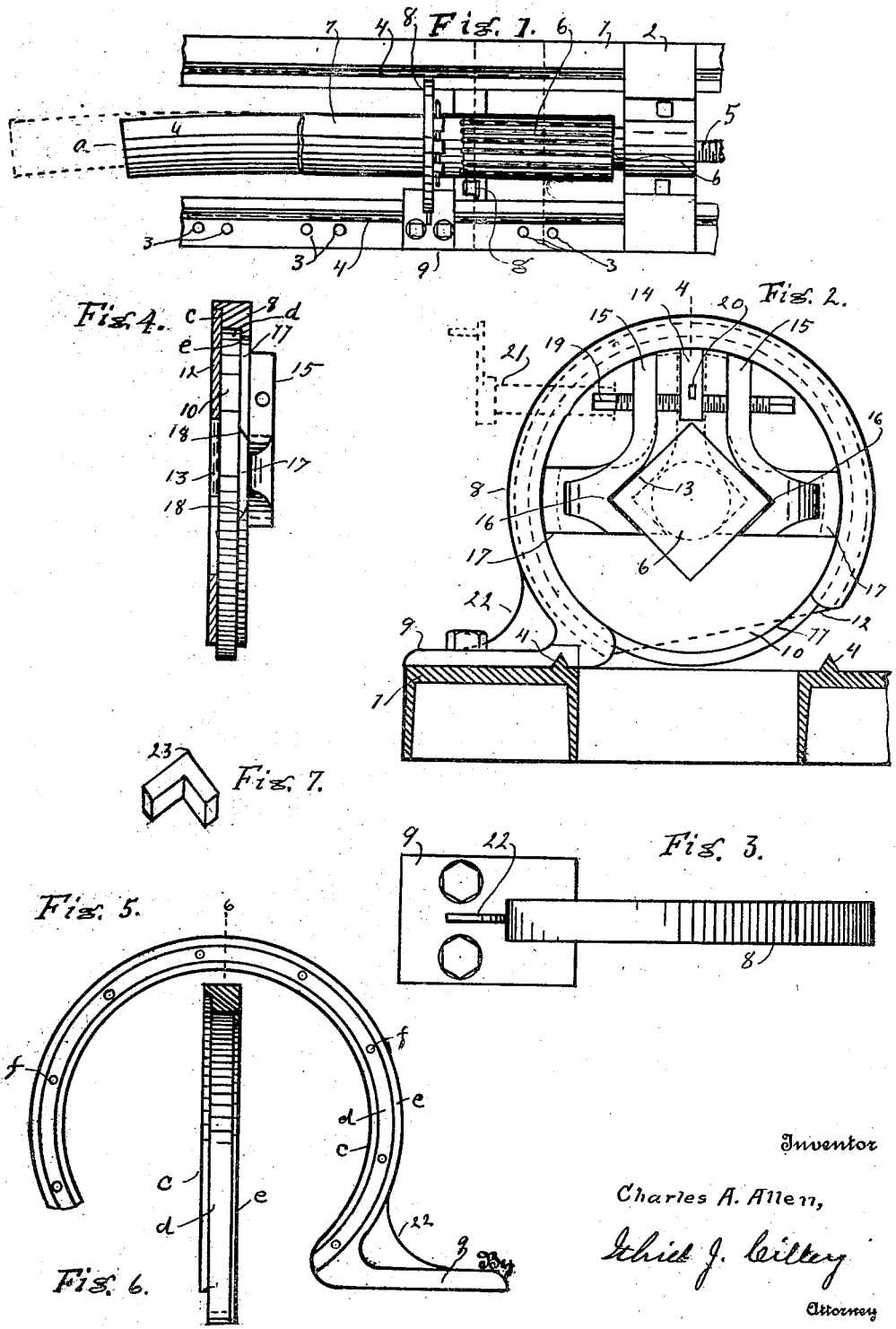

1,521,146

UNITED STATES PATENT OFFICE.

CHARLES A. ALLEN, OF GRAND RAPIDS, MICHIGAN.

LATHE REST.

Application filed April 21, 1923. Serial No. 633,771.

*To all whom it may concern:*

Be it known that I, CHARLES A. ALLEN, a citizen of the United States, residing at Grand Rapids, in the county of Kent and State of Michigan, have invented certain new and useful Improvements in Lathe Rests, of which the following is a specification.

My invention relates to improvements in lathe rests for use in lathes in which spindles and like productions are beaded lengthwise, and its objects are: first, to provide a rest with which the spindle may be held safely against the danger of springing in the lathe and rendering it possible to form the beads too deeply on one part of the spindle and too shallow upon another part thereof; and, second, to avert the possibility of the spindle trembling and forming rough and unsightly beads.

I attain these objects by the mechanism and construction of parts shown in the accompanying drawing, in which Fig. 1 is a plan of a part of a lathe of the kind upon which my rest is to be used, with a large spindle in place. Fig. 2 is a side elevation of the rest. Fig. 3 is a plan of the same. Fig. 4 is a sectional view of the outer frame of the rest practically on the line 4 of Fig. 2, and an edge elevation of the plate and jaws. Fig. 5 is a back elevation of the frame of the rest. Fig. 6 is a sectional elevation of the same looking to the right from the line 6 of Fig. 5, and, Fig. 7 is a perspective of an insert for the clamping jaws of the rest.

Similar reference characters indicate similar parts throughout the several views.

This rest consists of a supporting frame 8 which is secured to the upper surface of the lathe frame 1 by means of bolts passing through the base 9 into the frame bed, and a central revoluble part or plate 10 having an offset 11 thereon that projects into position flush with the outer surface of the frame, the periphery of the body part of the frame 10 and of the offset 11 forming closely fitting revoluble bearings in the frame 8 so the plate 10 may be made to revolve as necessary, as each bead is formed upon the spindle 7, as at 6. The plate 10 is held in place in the frame 8 by means of a back plate 12 that is securely connected with the frame by means of bolts, screws or like device, passing through the plate 12 and into the bolt holes *f*, so the plate 10 is held safely from the danger of the least lateral movement. The plate 10 is provided with an opening 13 through it, and also through the plate 12, through which the spindle 7 is passed, and the said spindle is held in place by means of adjustable bearing pieces or jaws 16 that are made with outwardly extending arms 15, and are supported upon slidable dovetailed plates 17 that are made to fit closely, and to slide freely in the dovetailed slot 18 in the offset 11 of the plate 10. A bearing piece 14 is made integral with the surface of the offset 11 into which a right and left hand screw 19 is anchored by means of a securing pin 20, and this screw threaded bolt is passed through screw threaded holes in the arms 15 of the jaws 16 so the jaws may be drawn together, or forced apart by simply revolving the said bolt as may be desired. The bolt is revolved by means of a key, shown in outline at 21.

Thus it will be seen that this rest may be made to accommodate itself to any size of spindle by adjusting the bearing jaws 16 as hereinbefore described, and, for extremely small spindles I provide inserts 23 that may be set between the jaws 16 to lessen the distance between bearing parts. Thus, with the plates 10, 11 and 12 properly seated upon the bearings *c*, *d* and *e* and securely held in place, the spindle 7 may be properly mounted upon the center *b*, and secured between the jaws 16 by drawing these jaws together with the screw bolt 19, as hereinbefore described, and as indicated in Figs. 1 and 2.

At 5 I have shown a screw feed for moving the spindle longitudinally through the rest 8, and at 22 I have shown a strengthening rib on the frame 8—9.

As the means of making the spindle revolve in the lathe is old, and has no relation to my invention, I have not shown it in the drawing.

4 represents the V formed track upon which the carriage 2, may be made to travel longitudinally of the lathe frame 1 for beading the spindles. At *g* I have indicated the position of the cutter head.

In Fig. 1 I have shown the lathe with no center at *a*, the back end of the spindle. I have made this rest so the spindle may be clamped at the longitudinal center close enough to perfectly support it, hence, even though the spindle may be crooked at one end, as a chair leg, the other end may be so held in the lathe as to insure straight, even beading and the crooked end will be free to swing naturally in the lathe back of the rest, as indicated at *a*, and the rest 8 may be set at different places on the lathe bed, as indicated by the bolt holes 3.

When using this rest as the sole support for the back end of the spindle, as indicated in Fig. 1, it is necessary to connect the other end of the spindle with the head center *b* of the lathe so said center will draw the spindle back into normal position after the completion of each bead upon the spindle, which may be done by the use of a screw center, in common use upon lathes of this general class, hence not necessary to show in connection with this application.

The dotted lines in Fig. 1 indicate the movements of the carriage 2 and of the spindle.

Having thus fully described my invention, what I claim as new in the art, is:—

In a rest for holding spindles steadily in a lathe when forming beads longitudinally thereon, an annularly formed body part securely mounted upon a lathe bed, said body having several bearings therein, a revoluble plate fitted to revolve in and upon said bearings, and having a central opening therethrough, a retaining plate secured to the back of the body for holding the revoluble plate in place in the body and having a central opening therethrough, the revoluble plate having a shoulder so formed that the front surface of the plate will stand flush with the front surface of the body, said projecting part of the plate having two alined dovetailed slots extending from the central opening in opposite directions to the edges of the plate, dovetailed slides mounted in said slots, a bearing jaw mounted upon each of said slides, an arm extending from each of said jaws to the edge of the extended part of the plate, said arms having screw threaded holes therethrough, an anchoring block integral with the plate and having a laterally positioned opening therethrough, a bolt passed through said opening and anchored therein against longitudinal movement, said bolt having a right handed thread from the center to one end, and a left handed thread from the center to the other end, and means for revolving the bolt to force the jaws towards and from each other simultaneously, and always in position to exactly center the spindle clamped between them, in the lathe.

Signed at Grand Rapids, Michigan April 19, 1923.

CHARLES A. ALLEN.